United States Patent
Keys et al.

(10) Patent No.: US 8,980,015 B2
(45) Date of Patent: *Mar. 17, 2015

(54) NON-CHROME PASSIVATION OF STEEL

(75) Inventors: Andrea Keys, Yardley, PA (US); Jeffrey I. Melzer, Lansdale, PA (US); Michael T. Raab, Langhorne, PA (US)

(73) Assignee: Chemtall Corporation, New Providence, NJ (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/154,502

(22) Filed: May 23, 2008

(65) Prior Publication Data

US 2008/0223490 A1 Sep. 18, 2008

Related U.S. Application Data

(63) Continuation of application No. 10/933,014, filed on Sep. 2, 2004, now abandoned.

(51) Int. Cl.
*C23C 22/07* (2006.01)

(52) U.S. Cl.
USPC ............................. 148/253; 148/247; 148/251

(58) Field of Classification Search
USPC .................................. 148/247, 252, 253, 251
IPC .................................. C23C 22/83,22/44, 22/34
See application file for complete search history.

(56) References Cited

U.S. PATENT DOCUMENTS

| | | | | |
|---|---|---|---|---|
| 5,985,047 A | * | 11/1999 | Buxton et al. | 148/247 |
| 6,376,588 B1 | * | 4/2002 | Nieh | 524/377 |
| 2001/0051265 A1 | * | 12/2001 | Williams et al. | 428/343 |
| 2003/0150524 A1 | * | 8/2003 | Wichelhaus et al. | 148/252 |
| 2004/0011429 A1 | * | 1/2004 | Miyamoto et al. | 148/254 |
| 2004/0020565 A1 | * | 2/2004 | Melzer et al. | 148/247 |

* cited by examiner

*Primary Examiner* — Weiping Zhu
(74) *Attorney, Agent, or Firm* — McAndrews Held & Malloy

(57) ABSTRACT

Chromate free treatments and compositions for applying a conversion or passivation coating to metal surfaces. Preferred compositions comprise a film forming latex polymer, fluoacid, phosphoric acid, and a polyoxyethylene/oxypropylene block copolymer. The requisite metal surfaces are contacted by the compositions and dried. Rinsing is optional.

12 Claims, No Drawings

NON-CHROME PASSIVATION OF STEEL

CROSS-REFERENCE TO RELATED APPLICATION

The present application is a continuation of U.S. patent application Ser. No. 10/933,014 filed Sep. 2, 2004.

FIELD OF INVENTION

The present invention relates to non-chromate coatings for metals. More particularly, the present invention relates to non-chromate coatings for steel surfaces to improve corrosion resistance and adhesion of paints to the surface. The invention provides a dried in place coating which is particularly effective at treating galvanized steel coil strip.

BACKGROUND

The purposes of the formation of a chromate conversion coating on the surface of galvanized steel are to provide corrosion resistance, improve adhesion of coatings and for aesthetic reasons. Chromate passivation of a galvanized steel surface is done to provide corrosion resistance and for aesthetic reasons on materials which are not to be painted. The conversion coating improves adhesion of coating layers such as paints, inks, lacquers and plastic coatings. Galvanized steel is typically treated with an aqueous composition containing hexavalent or trivalent chromium ions with other additives to create a chromium conversion coating.

Growing concerns exist regarding the pollution effects of chromates discharged into rivers and waterways by such processes. Because of the high solubility and the strongly oxidizing character of hexavalent chromium ions, conventional chromate conversion processes require extensive waste treatment procedures to control their discharge. In addition, the disposal of the solid sludge from such waste treatment procedures is a significant problem.

Accordingly, there is a need in the art to provide an effective non-chromate treatment to provide a dried in place conversion or passivation coating to inhibit metal surface corrosion and enhance adhesion of paint or other coatings that may be applied to the metal surface.

SUMMARY OF THE INVENTION

The present invention provides a method of treating the surface of metals, such as steel or galvanized steel, to provide for the formation of a coating which increases the corrosion resistance and adhesion properties of the metal surface. The passivation or conversion coating formed by the present invention may be dried in place or rinsed. The methods of the invention comprise contacting the requisite metal surface with a chromate free aqueous treatment composition comprising: (a) a film forming latex polymer; (b) a fluoacid; (c) phosphoric acid; and (d) a polyoxyethylene/oxypropylene block copolymer. Other objects and advantages of the invention will be apparent from the following description and the appended claims.

DETAILED DESCRIPTION

The inventors have found that an improved, non-chromate conversion or passivation coating can be provided on metal surfaces, particularly galvanized steel surfaces, by contacting the surface with an aqueous coating solution or dispersion of:
(a) a film forming latex polymer;
(b) a fluoacid;
(c) phosphoric acid; and
(d) a nonionic polymer surfactant.

Compositions of the invention have been found to provide an aqueous pretreatment agent for the treatment of galvanized metal surfaces which provides improved corrosion resistance and adhesion of latex applied coating when the treatment is dried in place.

As to the film forming latex polymer component, this can be chosen from a wide variety of materials such as styrene-butadiene copolymers, acrylate resins, polyvinylacetate, urethanes, amido-amine polymers, and similar materials. Some commercially available latex materials include:

| Description | Type |
| --- | --- |
| "Neocar" (Union Carbide) | Vinyl Ester/Acrylic |
| "Res 3077" (Rohm & Haas) | Vinyl Acetate/Acrylic |
| "Airflex" 500 (Air Products) | Vinyl Acetate/Ethylene |
| "Airflex 4514 (Air Products) | Vinyl Chloride/Amide Terpolymer |
| Airflex 4500 (Air Products) | Vinyl Chloride/Amide Terpolymer |
| Flexhane 620 (Air Products) | Urethane |
| Vinac 884 (Air Products) | Vinyl Acetate |
| Dow 620 (Dow) | SBR |
| Airflex 4530 (Air Products) | ethylene vinyl chloride |
| Kymene 736 | polyamido amine |
| U Car Latex 651 | acrylate |

At present, it is preferred to utilize "U Car Latex 651" as the film forming latex polymer component. This is commercially available from Union Carbide and is reportedly an acrylic copolymer resin emulsion having as major latex components butyl acrylate, methyl methacrylate, and methacrylic acid polymers.

As to the fluoacid that is present in the treatment formulation, this is preferably a fluoacid of a Group IVB metal or mixtures thereof. Fluotitanic acid $H_2TiF_6$, is presently preferred with fluozirconic acid, $H_2ZrF_6$, also mentioned as exemplary. Combinations of these acids are also used.

As stated above, phosphoric acid, $H_3PO_4$, and salts thereof are also present in the treatment formulation. The phrase "phosphoric acid" used herein, refers to both the acid and salt form.

With regard to the non-ionic polymer surfactant, a polyoxyethylene/oxypropylene block copolymer is exemplary. The ethylene oxide (EO):propylene oxide (PO) repeat units of the copolymers may be present in a molar ratio of about 1:1-9; preferably 1:5-9; most preferably 1:9. Molecular weights of these block copolymers will range from about 2,000-4,000. These copolymers are commercially available from BASF under the "Pluronic" trademark. Presently, "Pluronic 101" is preferred for use. This specific copolymer has a ratio of EO:PO blocks of about 1:9 and a molecular weight of about 3,300.

Compositions in accordance with the invention are chromate free and include

| | |
| --- | --- |
| 0.01-50 wt % | film forming latex |
| 0.01-40 wt % | $H_3PO_4$ |
| 0.01-30 wt % | fluoacid |
| 0.01-20 wt % | non-ionic polymer surfactant | wherein the weight of the composition is, in total, 100 wt %.

More preferred are compositions having the following range (in wt %) of the components

| | |
|---|---|
| 1-20 wt % | film forming latex |
| 1-50 wt % | H$_3$PO$_4$ |
| 1-40 wt % | fluoacid |
| 0.01-15 wt % | non-ionic polymer surfactant |
| remainder water. | |

The sum of all composition components equals 100 wt %. The pH of the compositions may vary from about 1.0 to 2.0.

The requisite metal surface may be contacted by the treatment in spray, immersion or roller applications. The treatment is then dried and the metal surface is ready for painting or other coating applications.

The conversion or passivation treatment of the present invention is applied to result in a conversion coating weight of greater than about 1 milligram per square foot to treated surface with a weight of 2-150 milligrams per square foot being more preferred. For use in commercial applications, working solutions comprising about 3-100, preferably 10-100 wt % concentrations of the above "More preferred" formulation are used to contact the desired metal surfaces.

EXAMPLES

The invention will now be described in conjunction with the following examples which are to be regarded as being illustrative of certain embodiments of the invention but should not be viewed to restrict the scope of the same.

Example 1

Treatment Formulations

One tested treatment candidate formulation "A", was a latex emulsion including the following components:

| | | |
|---|---|---|
| 1) | U Car Latex 651 | 5.8 wt % (65% actives) |
| 2) | H$_3$PO$_4$ | 22.0 wt % |
| 3) | Fluotitanic acid | 10 wt % |
| 4) | Pluronic 101 | 0.5 wt % |
| 5) | Water remainder | |

U Car Latex 651 is an acrylic copolymer resin emulsion having a viscosity 20° C., cP (Brookfield, LVT #3, 50 rpm) of 400 and a particle size in microns of 0.45. It is available from the Union Carbide Corporation of Danbury, Connecticut. Its major constituents are 1) butyl acrylate, methyl methacrylate, methacrylic acid polymers in an amount of <65 wt %; 2) water—35%; 3) glycols, polyethylene, mono [(1,1,3,3-tetramethylbutyl)phenyl]ether in an amount of less than 2%; and 4) ammonia in 0.2 wt %. It is a white liquid.

Pluronic 101 is a difunctional block copolymer surfactant terminating in primary hydroxy groups and is available from BASF Corporation in Mount Olive, N.J. It is a block copolymer having hydrophobic propylene oxide (PO) repeat units and hydrophilic ethylene oxide (EtO) repeat units in a molar ratio of about 9:1. The overall molecular weight of the copolymer is about 3300.

Test panels for the examples were prepared as follows: G70/70 hot dipped galvanized steel test panels purchased from ACT Laboratories were spray cleaned with a 3% aqueous solution of an alkaline surfactant product and then rinsed with DI water and subsequently coated with the test treatment formulations by spin coat application, followed by forced air drying.

A. NSS—Neutral Salt Spray Test per ASTM B 117 and rated according to ASTM D-1654 (% white rust).

B. Water Resistance—ASTM D 4585—Water Resistance of Coatings Using Controlled Condensation wherein condensation is produced by exploring one surface of a coated specimen to a heated, saturated mixture of air and water vapor while the reverse side of the specimen is exposed to the cooling effect of room temperature. (% white rust).

C. Water Resistance of Coatings in 100% Relative Humidity according to ASTM 2247-97 (% white rust).

Test Results

| | Test & Result | | |
|---|---|---|---|
| Treatment | ASTM B117/D1654 48 Hrs. NSS | ASTM D4585 240 Hrs QCT | ASTM D2247-97; 100% Rel Humidity 408 hours |
| A | 1 | 0 | 0 |
| C-1 | 1 | 0 | 0 |
| C-2 | 100 | 1 | 10 |

C-1 is a state of the art, chrome containing hexavalent chromium passivation.
C-2 is commercially available non-chrome passivation.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of forming a conversion or passivation coating on a metal surface comprising contacting said metal surface with a chromate free aqueous treatment composition comprising:
    (a) 1-20 wt % of a film forming latex polymer;
    (b) 1-40 wt % of a fluoacid;
    (c) 1-50 wt % of a phosphoric acid; and
    (d) 0.01-15 wt % of a non-ionic polyoxyethylene/polyoxypropylene block copolymer surfactant.

2. A method as recited in claim 1, wherein said fluoacid comprises a fluoacid of a Group IVB metal.

3. A method as recited in claim 1, wherein said non-ionic polyoxyethylene/oxypropylene block copolymer comprises a mole ratio of ethylene oxide (EO):propylene oxide (PO) groups of about 1:1-9.

4. A method as recited in claim 3, wherein said EO:PO molar ratio is about 1:5-9.

5. A method as recited in claim 4, wherein said non-ionic polyoxyethylene/polyoxypropylene block copolymer has a molecular weight of about 2,000-4,000.

6. A method as recited in claim 1, wherein said metal surface is a zinc covered metal surface.

7. A method as recited in claim 1, wherein said metal surface is galvanized steel.

8. A method as recited in claim 1, wherein said metal surface is aluminum.

9. A method as recited in claim 1, further comprising drying said metal after said chromate free aqueous treatment composition has been brought into contact with said metal, then painting said metal.

10. A method as recited in claim 1, wherein the pH of said composition is from about 1 to about 2.

11. A method as recited in claim 1, wherein said latex polymer comprises an acrylate resin.

12. A method as recited in claim 11, wherein the acrylate resin comprises butyl acrylate, methyl methacrylate, and methacrylic acid polymers.

* * * * *